Feb. 10, 1959     H. H. HERRING     2,873,382
REMOTE CONTROL STARTING ASSEMBLY
Filed Oct. 16, 1956
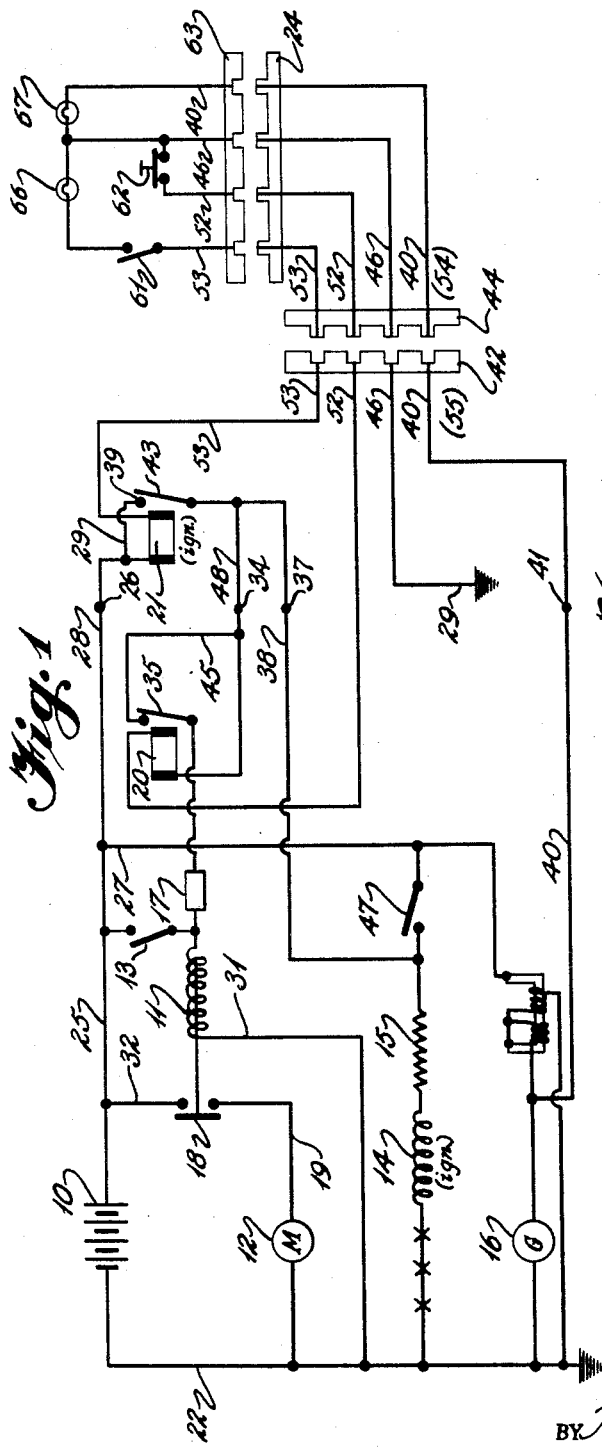
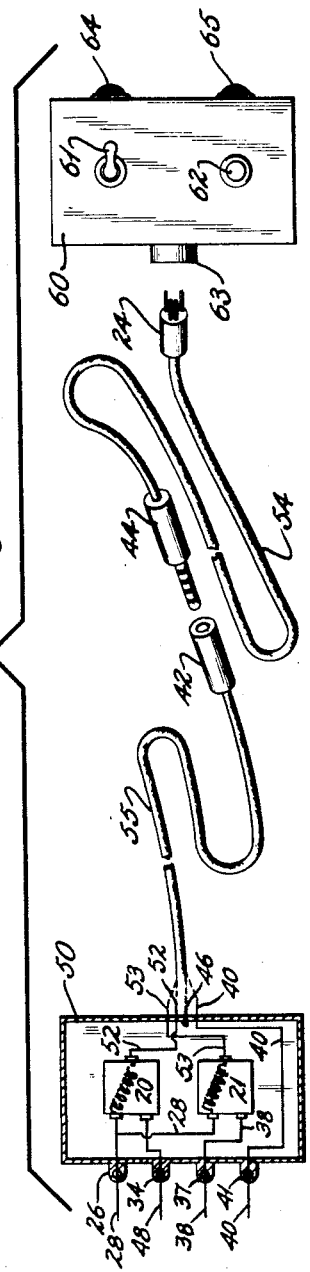
INVENTOR
Henry H. Herring
BY *Henry H. Snelling*
ATTORNEY United States Patent Office
2,873,382
Patented Feb. 10, 1959

2,873,382

REMOTE CONTROL STARTING ASSEMBLY

Henry H. Herring, Kinston, N. C.

Application October 16, 1956, Serial No. 616,246

3 Claims. (Cl. 290—37)

This invention relates to remote control means for starting an automobile motor or other similar engine during periods of below freezing weather and has for its prime object the provision of a kit which may be sold as a unit and be of such nature that it can be installed in a reasonably short time by a purchaser having but little experience with mechanism and with practically no chance of the parts being incorrectly assembled, either in the automobile or in the dwelling or other place where the control means may be located.

A further object of the invention is to provide a system which will connect the vehicle to a control box by a two or three part cable having only four wires, the cable parts being readily separable by an easily accessible connector member, the socket of which is fast to the grille of the vehicle, so that when the plug of the connector is withdrawn and the automobile driven there will be no visible evidence of the control system. For a three part cable an optional second separable connector at the control box is provided, this making the installation of the kit more easily assembled than if the four wires of the cable were required to be separately secured to lead-in posts in the control box as in a two part cable.

Another object of the invention is to provide a system of the nature described in which the engine starter circuit and the ignition coil circuit are both provided with relays so that the main portion of the cable connecting the control box and the automobile may be of considerable length, up to 500 feet or more when desired.

A still further object of the invention is to provide a control box or panel in which a toggle switch closes the ignition circuit and a spring button switch closes the starter circuit, there being two individual visual signals, such as lamp-operated jewel lenses, one to indicate that the ignition circuit has been completed, and the other when lighted to indicate that the motor is running. With such equipment the driver may close the toggle switch, lighting the ignition signal, and then press the button of the other switch, releasing the spring pressed switch as soon as the second lens is illuminated which indicates that the generator is operating and consequently the automobile engine is running. The generator light stays on until the toggle switch is opened or the cable connection is broken. In case the driver is unduly delayed he can always shut off the engine by closing the toggle switch, but the engine will stay warm for a considerable period of time.

In the drawings:

Figure 1 is a wiring diagram.

Figure 2 is a perspective of the kit before installation, showing the boxes in plan, and not to scale.

In the drawings the battery 10, the starter control solenoid 11, the starter motor 12, the starter switch 13, the ignition coil 14, and the generator 16 are normal parts of the automobile. The resistor 15 may or may not be present depending upon the battery voltage. The same is true of the gear shift safety switch 17 with which automatic-shift cars are now equipped.

Battery 10 is grounded at one side by wire 22 and at the other side is connected by wires 25 and 28 to the coil of the ignition relay 21. This coil is energized only when the toggle switch 61 in the remote control switch box is closed. Solenoid coil 11 for the starter motor 12 is connected to ground by wire 31 and is energized when coil 20 closes its switch 35. Its armature switch 18 joins wire 19 from starter motor 12 to wire 32 connected to battery 10 whenever switch 35 or the usual starter switch 13 is closed.

The ignition coil circuit is closed around the usual key-controlled switch 47 by battery 10, wires 25 and 26, terminal 39, switch 43, and wire 38 when the coil 21 of the ignition relay is energized by closing toggle switch 61. Generator 16 is connected by wire 40 direct to socket member 42 of a separable connector having a plug member 44. The socket 42 of this connector is most conveniently secured to a readily accessible portion of the car, my preference being to fasten the elongated socket 42 (see Figure 2) to the grille of the automobile so that while the plug 44 can readily be inserted in and removed from the socket, the socket itself is inconspicuous when the connector 42—44 is separated by removal of plug 44. My preference is to use a connector only slightly larger than the cable 55, the plug having four transverse rings on its single prong. Each of the connectors is of a type that can be assembled in only one way, the other connector having unevenly spaced prongs as in four prong radio tubes.

Wire 46 of cable 55 to the socket 42 is connected to ground as at 29 inside the assembly box 50 in which are mounted the starter relay 20 and the ignition relay 21. This assembly box 50 (Figure 2) receives the wires 53 from coil 21, 52 from coil 20, ground wire 46, and 40 from the generator as a cable 55 on one side of the box and on the other side has four binding posts 26, 34, 37, and 41. These respectively join wires 27 and 28 both at post 26 to wire 25 from the battery; post 34 connects wire 48; post 37 connects wire 38; while wire 40 to post 41 keeps its numeral, merely passing thru the box 50 for ease of assembly of the wires by a somewhat unskilled automobile owner.

The remote control switch box 60 may be installed permanently on a wall of the dwelling or other place from which it is desired to start the automobile engine or it may be portable as it is quite small and light in weight. This box has on its top the toggle switch 61 and the spring push button switch 62. Box 60 preferably has a socket 63 in one side of the box and has on the opposite side small jewel lenses 64 and 65 illuminated by lamps 66 and 67, these respectively indicating that the ignition circuit is energized and that the generator is operating. The toggle switch 61 connects ignition wire 53 in series through light 66 to ground wire 46. Spring push button starter switch 62 connects starter wire 52 to ground wire 46. Generator wire 40 passes to lamp 67 which is connected on the opposite side to the ground wire 46.

On leaving the car at night either in the garage or in a driveway the driver removes the ignition key of the car, thus opening switches 13 and 47. He must be sure to move the automatic shift to neutral (or "parking" with certain cars); otherwise, the safety switch 17 will prevent operation of the remote control. Upon locking the car he picks up plug 44 at one end of long cable 54 extending to the parking place of the car and pushes this plug into socket 42 fast to the grille of the car, this socket forming the end of short cable 55 which is entirely inside of the motor space under the hood. Connector 24—63 is rarely disconnected as its socket is part of box 60 and it is furnished merely to simplify assembly by one not skilled in electrical work.

In the morning, at an appropriate time before desiring to use the car, the driver first turns toggle switch 61 of control box 60 to "on" position. This sends current from battery 10, wire 25, coil 21, wire 53, switch 61, signal lamp 66, to ground wire 46, thus closing switch 43 of ignition relay 21, energizing ignition coil 14 via wire 38 and wires 25 and 28 from battery 10, the same as if the key-controlled switch 47 were closed. As the switch 43 of the ignition relay coil 21 closes, the current flows: battery 10, wires 25, 28 and 29, terminals 39, switch 43, wire 48, coil 20, to wire 52 and open switch 62 in the control box. This allows closing of starter relay switch 35 by pressing spring push button switch 62 to ground coil 20, the circuit closed by starter relay switch 35 being: battery 10, wires 25 and 28, terminal 39, switch 43, wires 48 and 45, switch 35, switch 17, solenoid coil 11, and wires 31 and 32. The toggle switch 61 usually remains closed until the driver is ready to leave his house.

The driver next presses the spring push button of starter spring push button switch 62 causing switch 35 to close and energize solenoid coil 11, causing switch 18 to close, thus energizing starting motor 12. The driver holds this spring push button down until light 67 shows through the jewel lens 65, indicating that the automobile engine is running. Light 66 burns as soon as toggle switch 61 is closed, indicating that the ignition is on. Lamp 67 is lighted when the generator is supplying current, a steady burning of light 67 indicating that the engine is warming up, while a going out of the light signifies that the spring switch button 62 should again be pressed. The generator 16 now operates, sending current via wire 40 to lamp 67 and to ground via wire 46. The automobile will be nicely warmed up after a suitable interval and if the windshield was covered with snow and the heater and defroster have been turned on, the windshield will be clear.

Where a cable having several branches of two or more wires of various lengths is designed to connect several units such as spark plugs, relays, signals, etc. to a central point such as a panel board, it is known in the trade as a harness. In my invention the harness is that part of the unit located at the plant to be controlled and consists of the usual conductors plus the relay box and one part of a connector.

What I claim is:

1. A system for remote control of the starting mechanism of a vehicle having a storage battery, a starter motor, a starter switch, an ignition system having an ignition coil, and a generator, comprising a solenoid operated switch controlling current to said starter motor, a starter relay having a coil, an ignition relay having a coil and an ignition switch, a remote control assembly including a toggle switch, a spring pressed switch, an ignition signal and a generator signal; wires for connecting the coil of the starter relay to the battery through the ignition relay and through the spring pressed switch to ground; wires connecting the ignition relay coil with the battery and the ignition signal; wires connecting the starter switch with said solenoid operated switch controlling the starter motor; wires connecting the generator to the generator signal; and wires connecting the switch of the ignition relay with the battery and the ignition coil; said toggle switch connecting the ignition relay coil with the ignition signal and ground, and said spring pressed switch completing a circuit through the coil of the starter relay and starting the motor.

2. The system of claim 1 in which the wires from the starter relay coil to the spring pressed switch, from the ignition relay coil to the ignition signal and toggle switch, and from the generator to the generator signal, and the ground wire together form a four wire cable, said cable having three sections separated by connectors having plugs and sockets, the second section of the cable at its two ends carrying all of the plugs of such connectors, and each of the connectors being of a type that can be assembled in only one way.

3. A kit for providing remote control for starting and stopping a power plant particularly of the automotive vehicle type having a storage battery, a generator for charging the battery an ignition system including an ignition relay solenoid, an electric starting motor; said kit being in three parts, namely a harness, a four wire cable, and a control unit; the harness comprising a relay box containing an ignition relay and a starter relay having a solenoid, a circuit closed by the ignition relay for energizing the ignition system, a circuit closed by the starter relay for energizing the starter motor, said harness also including one half of a separable connector with four terminals, and four conductors leading from the terminals, one conductor going to ground, one conductor going to the solenoid of the ignition relay, one conductor going to the solenoid of the starter relay and one conductor going to the generator; the four wire cable having a connector at one end for electrically joining its four wires to the four terminals of the harness connector, and a four terminal connector at the other end for coupling to the control unit; each of the two connectors being of a type that can be assembled in only one way; the control unit comprising two signal lamps, a first pair of conductors connecting one lamp to two terminals of the control unit, a second pair of conductors connecting the other lamp to two terminals of said control unit, a push button switch connecting a common grounded conductor of the pair to a fourth conductor connected to the solenoid of the starter relay, and a toggle switch in the first pair; said connectors, conductors and switches being so arranged that closing of the toggle switch lights said one lamp, closes the circuit through the solenoid of the starter relay, and at the same time energizes the ignition relay which in turn energizes the ignition system, and closing of the push button switch energizes the starter relay which in turn energizes the starter motor whereupon the generator lights up the said other lamp upon coming up to speed.

References Cited in the file of this patent

UNITED STATES PATENTS

| | | |
|---|---|---|
| 1,479,808 | Hayward | Jan. 8, 1924 |
| 1,738,710 | Jones | Dec. 10, 1929 |
| 1,771,953 | Conklin | July 29, 1930 |
| 2,012,924 | Conklin | Aug. 17, 1935 |
| 2,352,774 | Dermond | July 4, 1944 |
| 2,361,412 | Paulus et al. | Oct. 31, 1944 |
| 2,382,647 | McLoughlin et al. | Aug. 14, 1945 |
| 2,423,464 | Moncrief | July 8, 1947 |
| 2,444,460 | Moncrief | July 6, 1948 |
| 2,520,071 | Tennefos | Aug. 22, 1950 |
| 2,544,955 | Harrelson | Mar. 31, 1951 |
| 2,606,298 | Merritt | Aug. 5, 1952 |
| 2,607,013 | Drummond | Aug. 12, 1952 |
| 2,706,806 | Johnson | Apr. 19, 1955 |
| 2,739,247 | Pope | Mar. 20, 1956 |